United States Patent
Jeon et al.

(10) Patent No.: US 10,393,499 B2
(45) Date of Patent: Aug. 27, 2019

(54) ANGLE DETERMINATING METHOD USING ENCODER SIGNAL WITH NOISE SUPPRESSION, ADJUSTING METHOD FOR OUTPUT SIGNAL OF ENCODER AND ABSOLUTE ENCODER

(71) Applicant: FASTECH CO., LTD., Bucheon-si (KR)

(72) Inventors: Jae Wook Jeon, Seoul (KR); Nguyen Xuan Ha, Suwon-si (KR); Jae Wan Park, Suwon-si (KR); Jun Young Moon, Sinan-gun (KR); Tae Won Kim, Sinan-gun (KR); Do Eon Lee, Daegu (KR)

(73) Assignee: FASTECH CO., LTD., Bucheon-si (KR)

( * ) Notice: Subject to any disclaimer, the term of this patent is extended or adjusted under 35 U.S.C. 154(b) by 210 days.

(21) Appl. No.: 15/586,566

(22) Filed: May 4, 2017

(65) Prior Publication Data

US 2017/0322014 A1   Nov. 9, 2017

(30) Foreign Application Priority Data

May 4, 2016 (KR) .......................... 10-2016-0055158
Apr. 27, 2017 (KR) .......................... 10-2017-0054629

(51) Int. Cl.
*G01D 5/245* (2006.01)
*G01B 7/30* (2006.01)
(Continued)

(52) U.S. Cl.
CPC .............. *G01B 7/30* (2013.01); *G01D 5/145* (2013.01); *G01D 5/245* (2013.01); *G01D 5/2448* (2013.01);
(Continued)

(58) Field of Classification Search
CPC .... G01D 5/145; G01D 5/2451; G01D 5/2454; G01D 5/3473; G01D 5/12
See application file for complete search history.

(56) References Cited

U.S. PATENT DOCUMENTS

| 9,379,598 B2 * | 6/2016 | Someya ............... G01D 5/2454 |
| 2011/0156505 A1 * | 6/2011 | Miyashita .............. G01D 5/145 |
| | | 310/46 |
| 2014/0015384 A1 * | 1/2014 | Someya ............... G01D 5/2454 |
| | | 310/68 B |

FOREIGN PATENT DOCUMENTS

| JP | 5052603 B2 | 10/2012 |
| KR | 10-2010-0016230 A | 2/2010 |

OTHER PUBLICATIONS

Korean Office Action dated Apr. 17, 2018 in corresponding Korean Patent Application No. 10-2017-0054629 (4 pages in Korean).

* cited by examiner

*Primary Examiner* — Alesa Allgood
(74) *Attorney, Agent, or Firm* — NSIP Law

(57) ABSTRACT

A method of determining an angle by an encoder includes generating a first angle data based on a rotation of a bipolar magnet and a second angle data based on a rotation of the multipolar magnet; determining a first waveform signal based on the first angle data and a second waveform signal based on the second angle data; converting the first waveform signal into a third waveform signal having a cycle similar to the second waveform signal; calculating an angle result value as a function of the second angle data and a determined value about a location of a rotation cycle of the multipolar magnet based on a difference between the second waveform signal and the third waveform signal; and determining an absolute angle corresponding to the calculated angle result value based on stored angle data.

20 Claims, 11 Drawing Sheets

(51) Int. Cl.
*G01D 5/14* (2006.01)
*H02K 11/215* (2016.01)
*G01D 5/244* (2006.01)
*G01P 3/44* (2006.01)
*G01P 3/487* (2006.01)
*G01P 3/489* (2006.01)
*H04L 1/00* (2006.01)

(52) U.S. Cl.
CPC ......... G01D 5/2451 (2013.01); G01D 5/2454 (2013.01); G01P 3/44 (2013.01); G01P 3/487 (2013.01); G01P 3/489 (2013.01); H02K 11/215 (2016.01); *H04L 1/0042* (2013.01)

[Fig. 1]
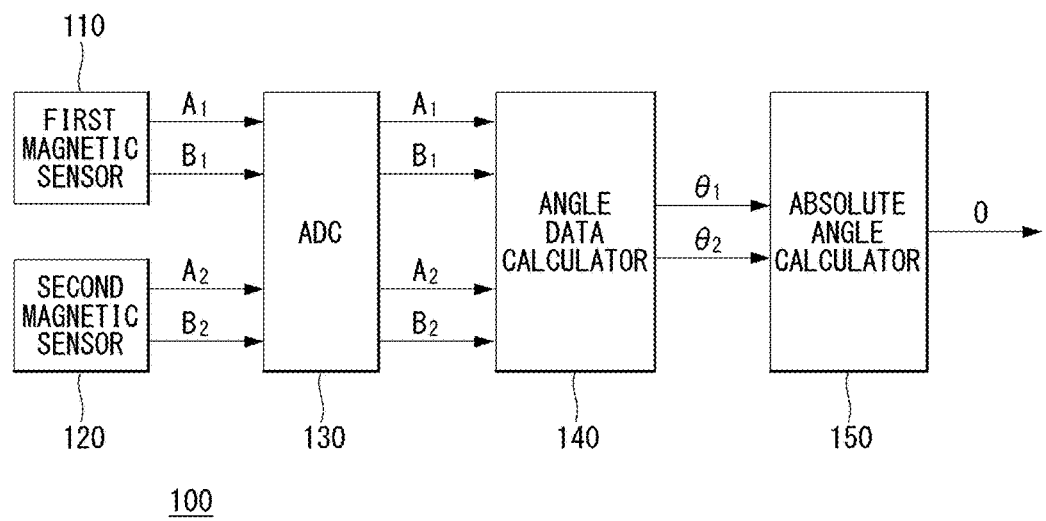
[Fig. 2]
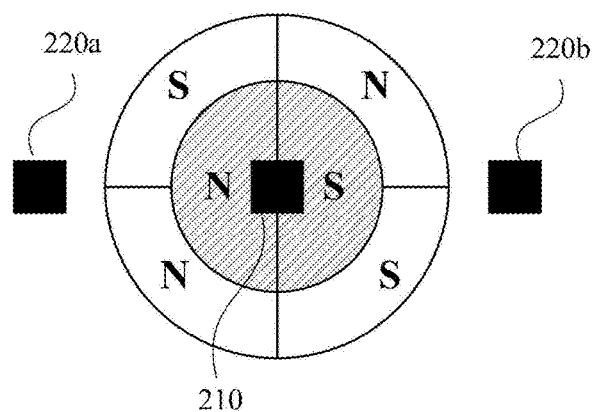

[Fig. 3]
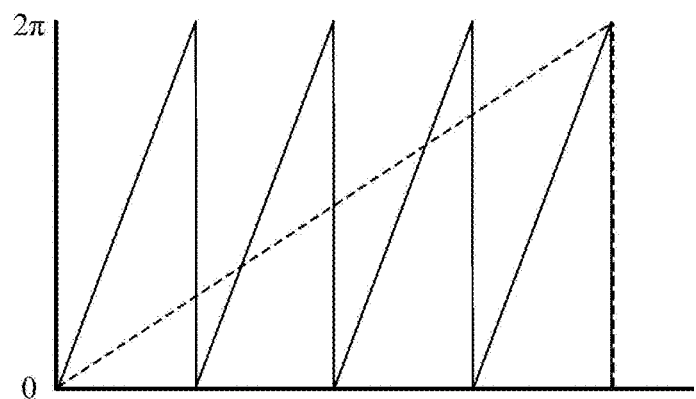
[Fig. 4A]
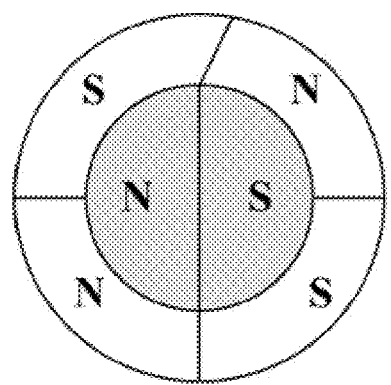

[Fig. 4B]
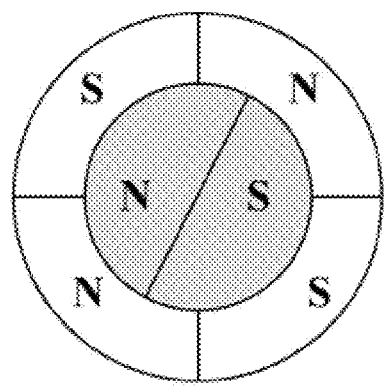
[Fig. 5]
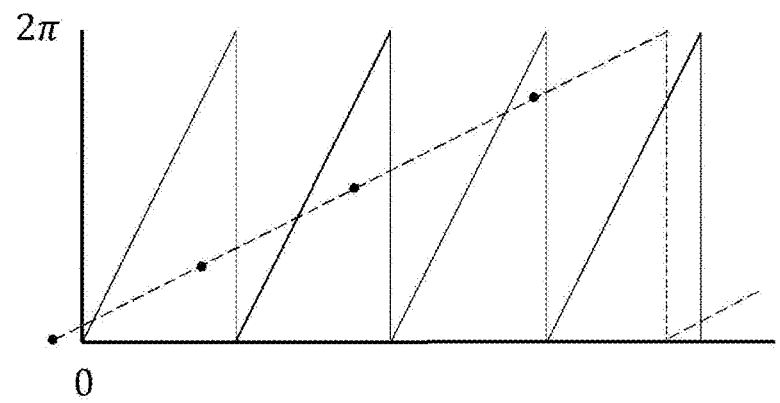

[Fig. 6]
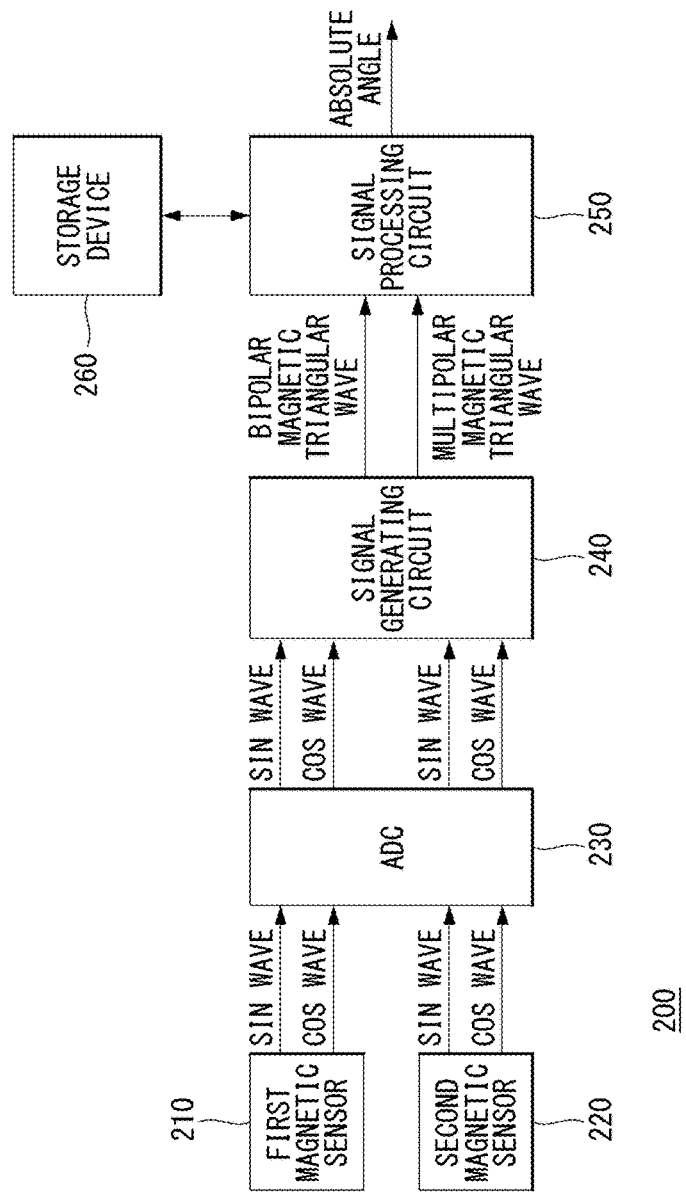

[Fig. 7]
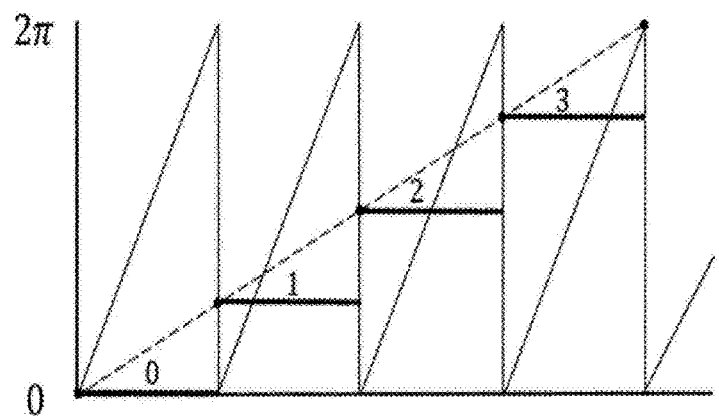
[Fig. 8A]
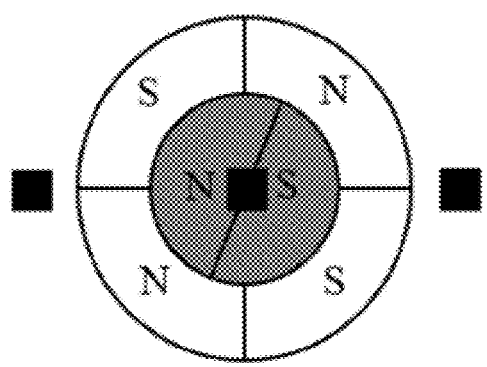

[Fig. 8B]
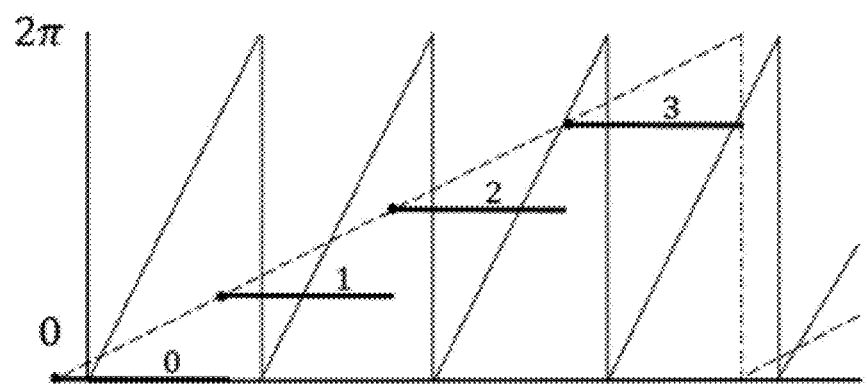
[Fig. 8C]
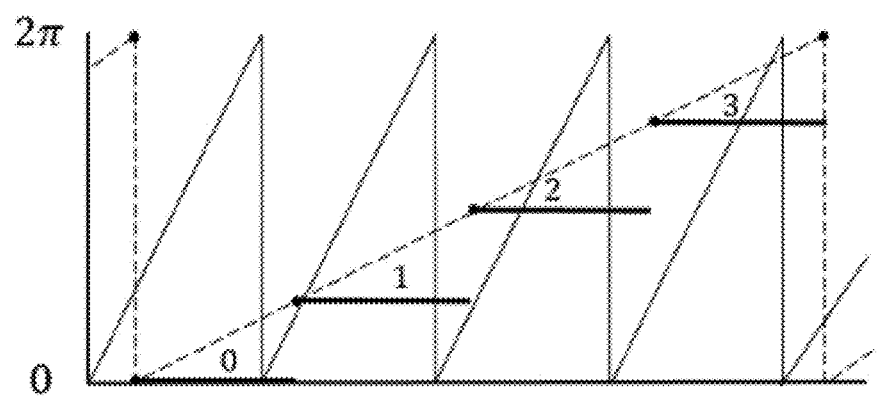

[Fig. 9A]
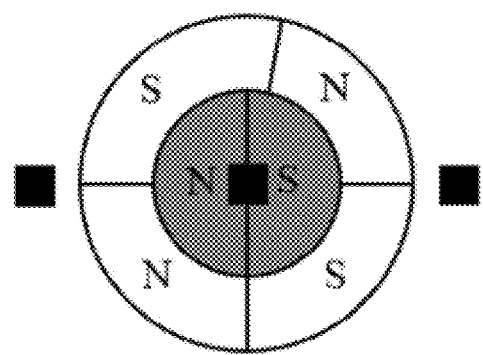
[Fig. 9B]
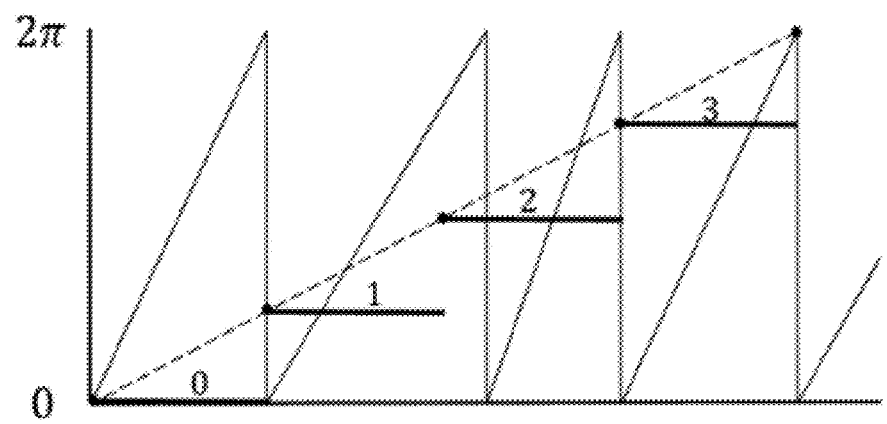

[Fig. 10A]
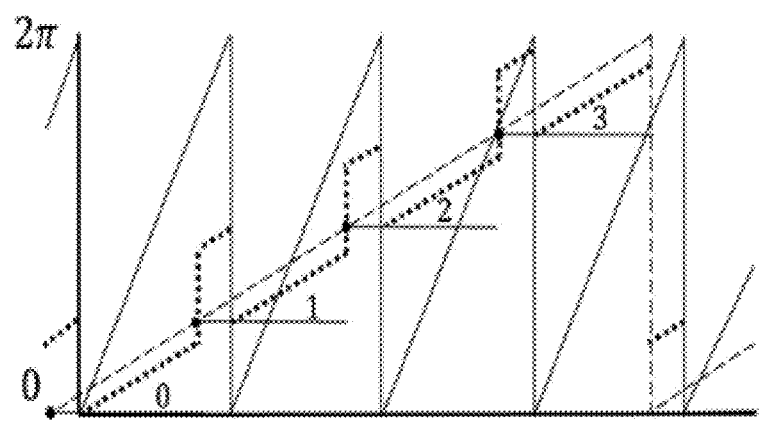
[Fig. 10B]
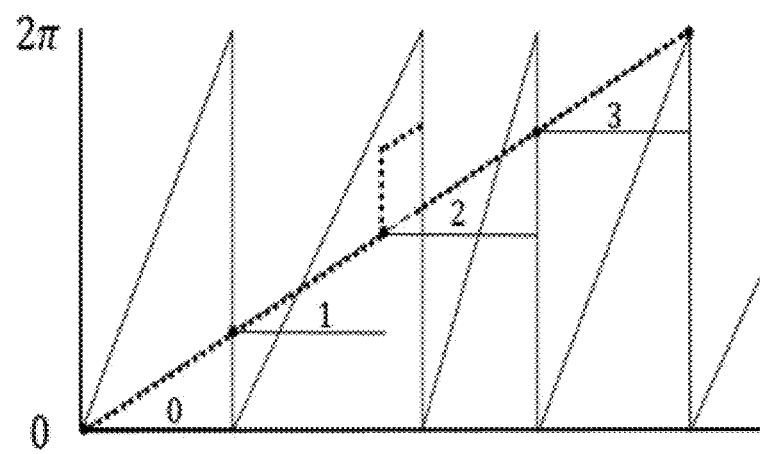

[Fig. 10C]
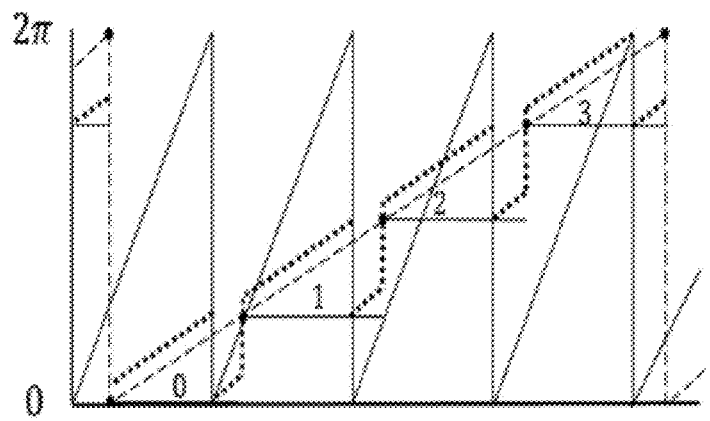
[Fig. 11A]
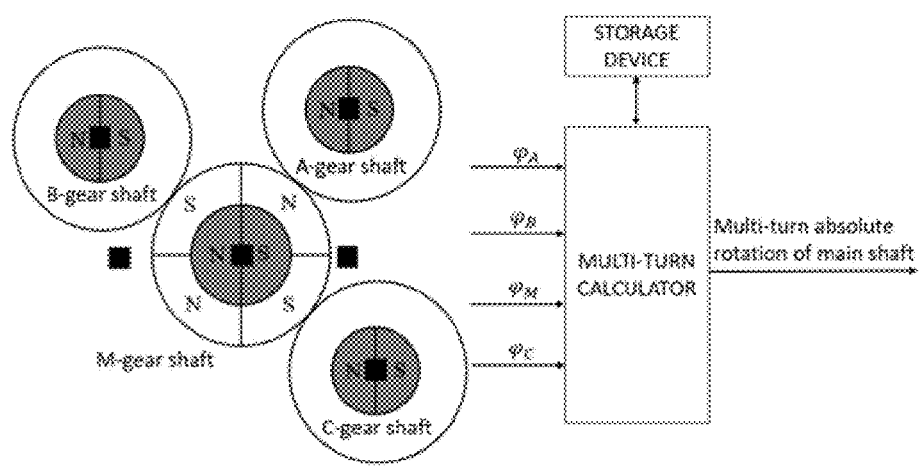

[Fig. 11B]
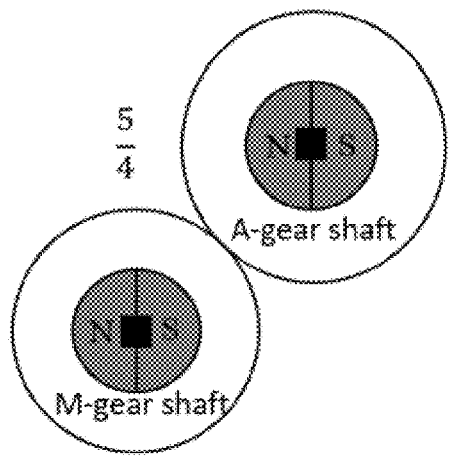
[Fig. 11C]
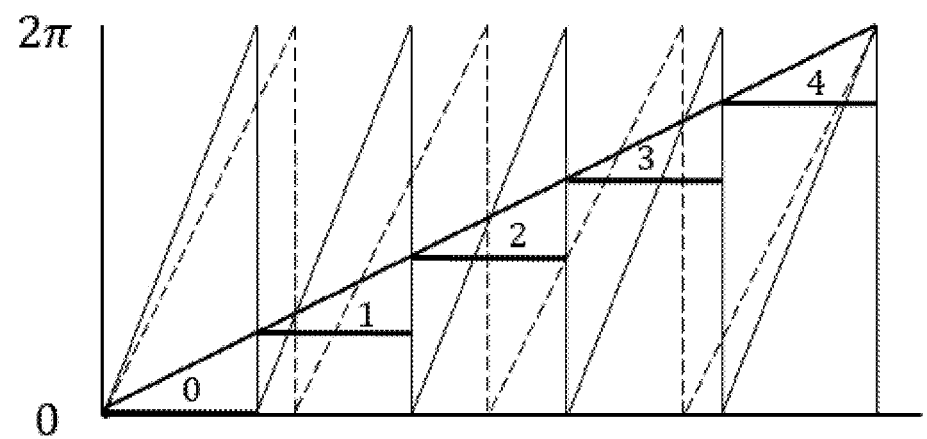

[Fig. 12A]
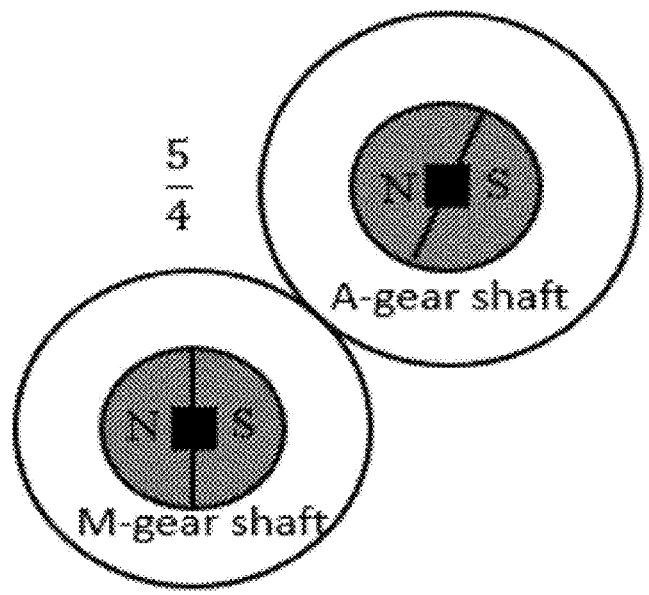
[Fig. 12B]
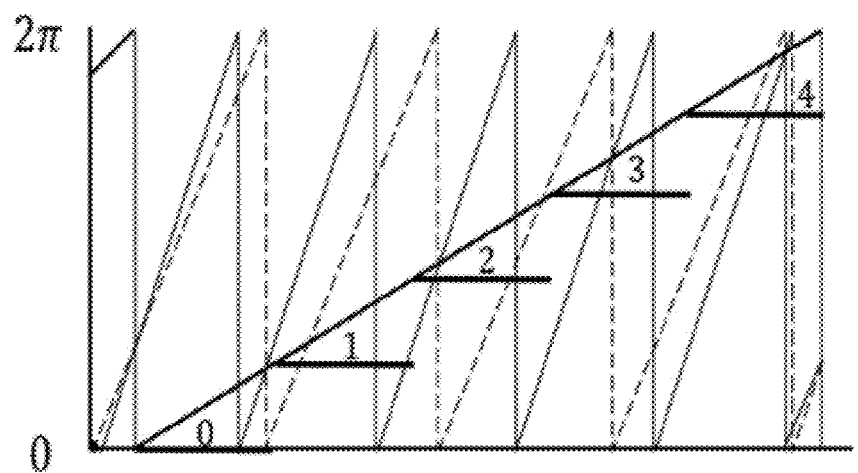

ANGLE DETERMINATING METHOD USING ENCODER SIGNAL WITH NOISE SUPPRESSION, ADJUSTING METHOD FOR OUTPUT SIGNAL OF ENCODER AND ABSOLUTE ENCODER

CROSS-REFERENCE TO RELATED APPLICATIONS

This application claims the benefit under 35 USC 119(a) of Korea Applications No. 10-2016-0055158 filed on May 4, 2016 and No. 10-2017-0054629 filed on Apr. 27, 2017 in the Korean Intellectual Property Office, the entire disclosure of which is incorporated herein by reference for all purposes.

BACKGROUND

1. Field

The present disclosure relates to a method of correcting a signal of an absolute encoder and a method of calculating an angle using the corrected signal.

2. Description of Related Art

An encoder is a device that detects the rotating angular speed and location of a rotating object. The encoders can be divided into an optical encoder and a magnetic encoder in accordance with units that detect rotation. Also, the encoders can be divided into an incremental encoder that measures a relative location with respect to a certain reference, and an absolute encoder that measures an absolute location regardless of power supply.

The magnetic encoder generates an output signal that can detect the rotating angular speed and the rotation location using a magnetic substance rotating together with a rotating object. The output signal of the magnetic encoder includes a pair of a sine wave and a cosine wave, based on an induced voltage of a rotating magnetic field, and can detect the rotation location and rotation speed from phases of the two waveforms. However, magnetic encoders are vulnerable to noise, phase fluctuations, DC offsets, amplitude fluctuations, and waveform distortions in the output signal. Accordingly, there have been many studies on a technique for removing a phase difference from an output signal of the magnetic encoder.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of determining an angle by an encoder includes generating a first angle data based on a rotation of a bipolar magnet and a second angle data based on a rotation of the multipolar magnet; determining a first waveform signal based on the first angle data and a second waveform signal based on the second angle data; converting the first waveform signal into a third waveform signal having a cycle similar to the second waveform signal; calculating an angle result value as a function of the second angle data and a determined value about a location of a rotation cycle of the multipolar magnet based on a difference between the second waveform signal and the third waveform signal; and determining an absolute angle corresponding to the calculated angle result value based on stored angle data.

The encoder may determine a location of the rotation cycle of the bipolar magnet, and convert the first waveform signal into the third waveform signal based on the location and a value obtained by subtracting two from a number of poles of the multipolar magnet.

The encoder may determine the determined value as a value obtained by adding 1 to the location of the rotation cycle when the difference is greater than or equal to 0, and determines the determined value as the location of the rotation cycle when the difference is less than 0.

The encoder may determine the location of the rotation cycle by dividing a value obtained by multiplying the first angle data by a number of poles of the multipolar magnet by $2\pi$.

The encoder may convert the third waveform signal by subtracting a value obtained by multiplying $2\pi$ by the location of the rotation cycle from a value obtained by multiplying the first angle data by a number of poles of the multipolar magnet.

The encoder may calculate the angle result value by adding a value obtained by multiplying $2\pi$ by the location of the rotation cycle to the second angle data, and the location of the rotation cycle may be determined by dividing a value obtained by multiplying the first angle data by a number of poles of the multipolar magnet by $2\pi$.

In another general aspect, a method of correcting an outputted signal by an encoder includes generating a first angle data based on a rotation of a bipolar magnet and a second angle data based on a rotation of the multipolar magnet; determining a first waveform signal based on the first angle data and a second waveform signal based on the second angle data; converting the first waveform signal into a third waveform signal having a cycle similar to the second waveform signal; determining a difference between the second waveform signal and the third waveform signal; converting the difference based on a period of the first waveform signal to determine a phase difference; and correcting the first waveform signal based on the phase difference.

The encoder may convert the third waveform signal by subtracting a value obtained by multiplying a location of a rotation period by $2\pi$ with a value obtained by multiplying the first angle data by a number of poles of the multipolar magnet, wherein the location of the rotation period is determined by dividing a value multiplied by the number of poles of a multipolar magnet by $2\pi$.

The method may further include calculating an absolute angle using the corrected first waveform signal and the second waveform signal.

In another general aspect, an absolute encoder includes a first magnetic sensor outputting first angle data based on a rotation of a bipolar magnet located at a rotation axis; a second magnetic sensor outputting second angle data based on a rotation of a multipolar magnet located at the rotation axis; a converter converting output signals of the first magnetic sensor and the second magnetic sensor into digital signals; a storage device comprising a table with angle result values and absolute angles; and a signal processing circuit configured to: determine a first waveform signal based on the first angle data and a second waveform signal based on the second angle data; convert the first waveform signal into a third waveform signal having a cycle similar to the second waveform signal; calculate an angle result value as a function of the second angle data and a reference value determined based on a difference between the second waveform signal and the third waveform signal; and calculate an absolute angle using the calculated angle result value and the table.

The first magnetic sensor may be located at a center of the bipolar magnet, and the second magnetic sensor is a pair of sensors located at opposing sides of the multipolar magnet adjacent to the first magnetic sensor.

In another general aspect, a method of correcting a number of rotations by an encoder includes generating a first angle data based on a rotation of a bipolar magnet and a second angle data based on a rotation of a multipolar magnet; calculating a first number of rotations of the multipolar magnet based on the first angle data and a number of poles of the multipolar magnet; converting the second angle data into a fourth angle data using the first number of rotations; and calculating an error value obtained by subtracting the second angle data from the fourth angle data, and correcting the first number of rotations to a second number of rotations of the multipolar magnet based on a range of the error value.

Calculating the first number of rotations of the multipolar magnet may include multiplying the first angle data by a number of poles of the multipolar magnet and dividing the result by $2\pi$ to calculate the first number of rotations of the multipolar magnet.

Transforming of the second angle data into the fourth angle data may include adding a value obtained by multiplying the first number of rotations by $2*\pi$ to the second angle data and dividing the result by a number of poles of the multipolar magnet.

Correcting the first number of rotations to the second number of rotations may include correcting the first number of rotations to the second number of rotations by subtracting 1 from the first number of rotations when the error value is larger than a value obtained by dividing the first angle data by a double of a number of poles of the multipolar magnet; and determining, when the second number of rotations 1 is less than zero, the second number of rotations as a value obtained by subtracting 1 from the number of poles of the multipolar magnet.

Correcting the first number of rotations to the second number of rotations may include correcting the first number of rotations to the second number of rotations by adding 1 to the first number of rotations when the error value is smaller than a value obtained by dividing a negative value of the first angle data by a double of a number of poles of the multipolar magnet; and determining, when the second number of rotations is larger than a value obtained by subtracting 1 from the number of poles of the multipolar magnet, the second number of rotations as 0.

The method may further include substituting the second number of rotations for the first number of rotations; and returning to converting the second angle data into the fourth angle data.

In another general aspect, a method of correcting a number of rotations by an encoder includes generating a first angle data based on a rotation of a first magnet and a second angle data based on a rotation of a second magnet; subtracting the second angle data from the first angle data to obtain an intermediate value; calculating a number of rotations of the first magnet based on the intermediate value and a rotation ratio of the second magnet with respect to one rotation of the first magnet; converting the first angle data into a fifth angle data using the number of rotations of the first magnet and the rotation ratio of the second magnet; and calculating an error value by subtracting the intermediate value from the fifth angle data, and correcting the number of rotations of the first magnet based on a range of the error value.

Correcting of the number of rotations may include subtracting 1 from the number of rotations when the error value is larger than a value obtained by dividing the intermediate value by a double of the rotation ratio of the second magnet; and determining, when the number of rotations corrected by subtracting by 1 is less than zero, the number of rotations as a value obtained by subtracting 1 from the rotation ratio of the second magnet.

Correcting of the number of rotations may include adding 1 to the number of rotations when the error value is smaller than a value obtained by dividing a negative value of the intermediate value by a double of the rotation ratio of the second magnet; and determining, when the number of rotations corrected by adding 1 is larger than a value obtained by subtracting 1 from the rotation ratio of the second magnet, the number of rotations as 0.

Other features and aspects will be apparent from the following detailed description, the drawings, and the claims

BRIEF DESCRIPTION OF THE DRAWINGS

FIG. 1 is a view illustrating a structure of a typical absolute encoder.

FIG. 2 is a view illustrating an example of an arrangement of sensors that sense a magnet and magnetism in an absolute encoder.

FIG. 3 is a view illustrating an example of a signal waveform detected by a sensor in accordance with the rotation of a bipolar magnet and a multipolar magnet.

FIGS. 4A-B are views illustrating examples of structures of a magnet used in an absolute encoder. FIG. 4A illustrates a multipolar magnet that is different in size. FIG. 4B illustrates a wrong assembly of the bipolar magnet and the multipolar magnet.

FIG. 5 is a view illustrating an example of a signal waveform detected using a magnet having the structure of FIG. 4.

FIG. 6 is a view illustrating a structure of another example of an absolute encoder.

FIG. 7 is a view illustrating an example of an ideal signal waveform detected by a sensor according to the rotation of a bipolar magnet and a multipolar magnet in an absolute encoder configured as shown in FIG. 2.

FIG. 8A is a view illustrating an example of a defective absolute encoder in which a bipolar magnet and a multipolar magnet are defectively assembled in an assembly process. FIGS. 8B and 8C are views illustrating examples of signal waveforms outputted by a defective absolute encoder wrongly assembled like FIG. 8A.

FIG. 9A is a view illustrating an example of a defective absolute encoder in which the sizes of multipolar magnets are differently produced in a process of mass production of multipolar magnets. FIG. 9B is a view illustrating an example of a signal waveform outputted by a defective absolute encoder wrongly manufactured like FIG. 9A.

FIGS. 10A-C are views illustrating examples of signal waveforms compensated by a disclosed solution. FIG. 10A shows a signal waveform obtained by correcting the signal waveform of FIG. 8B. FIG. 10B shows a signal waveform obtained by correcting the signal waveform of FIG. 9B. FIG. 10C shows a signal waveform obtained by correcting a signal waveform of FIG. 8C FIG. 11A is a view illustrating an example of a structure of multi-turn absolute rotation module of absolute encoder include three secondary-shaft gears mesh with a main-shaft gear. FIG. 11B is a view illustrating an example of a structure of A-shaft gear mesh with a main-shaft gear (M-gear) of multi-turn absolute rotation module. FIG. 11C is a view illustrating an example of an ideal signal waveform outputted from an absolute encoder having the structure as shown in FIG. 11B.

FIG. 12A illustrates an example of a defective multi-turn absolute rotation module of absolute encoder manufactured with A-shaft gear mesh with a main-shaft gear (M-gear), and FIG. 12B illustrates an example of a signal waveform outputted from the defective absolute encoder of FIG. 12A.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a view illustrating an example of a structure of a typical absolute encoder 100. The absolute encoder 100 includes a first magnetic sensor 110, a second magnetic sensor 120, an Analog to Digital Converter (ADC) 130, an angle data calculator 140, and an absolute angle calculator 150. The ADC 130, the angle data calculator 140, and the absolute angle calculator 150 may be configured with one circuit. Although not shown, a bipolar magnet and a multipolar magnet may be located at the rotation axis.

The first magnetic sensor 110 outputs signals A1 and B1 according to the rotation of the bipolar magnet, and the second magnetic sensor 120 outputs signals A2 and B2 according to the rotation of the multipolar magnet. The ADC 130 converts an analog waveform signal into a digital signal. The ADC 130 generates digital signals by sampling an A signal and a B signal having a phase of 90 degrees at a certain cycle, respectively.

The angle data calculation unit 140 calculates a specific angle by processing a signal transmitted by the rotation of each magnet through an inverse trigonometric function (arc tan). The angle data calculator 140 calculates a first angle $\theta1$ from the signal generated by the first magnetic sensor 110, and calculates a second angle $\theta2$ from the signal generated by the second magnetic sensor 120. The absolute angle calculator 150 calculates an absolute rotation angle of the rotation axis from the first angle $\theta1$ and the second angle $\theta2$, and thus calculates an absolute angle data $\theta$. The absolute angle calculator 150 uses a table for calculating the absolute angle.

FIG. 2 is a view illustrating an example of an arrangement of sensors that sense a magnet and magnetism in an absolute encoder. FIG. 2 illustrates an arrangement of sensors that sense the rotation of a magnet in an absolute encoder. FIG. 2 shows a bipolar magnet (indicated by an oblique line) located at the center and multipolar magnets located at the outer side of the bipolar magnet. The center of the bipolar magnet and the multipolar magnets corresponds to the rotation axis. In FIG. 2, the multipolar magnet is shown as a quadrupolar magnet. The multipolar magnet is a magnet having a larger number of poles. As the number of poles of the multipolar magnet increases, the resolution becomes higher. However, for convenience of explanation, a quadrupolar magnet will be exemplified.

A first magnetic sensor 210 that senses the magnetism of the bipolar magnet is located at the center of the bipolar magnet. Second magnetic sensors 220a and 220b that sense the magnetism of the multipolar magnet is located at the outer sides of the multipolar magnet. The second magnetic sensor may be disposed in a pair. The first magnetic sensor 210 and the second magnetic sensors 220a and 220b are located on the same line.

FIG. 3 is a view illustrating an example of a signal waveform detected by a sensor in accordance with the rotation of a bipolar magnet and a multipolar magnet. When the magnetic sensors are disposed as shown in FIG. 2, signals detected by each sensor has a waveform as shown in FIG. 3. In FIG. 3, the horizontal axis corresponds to the time, and the vertical axis corresponds to the degree of rotation. In FIG. 3, the dotted line indicates a waveform according to the rotation of the bipolar magnet, and the solid line indicates a waveform according to the rotation of the multipolar magnet (quadrupolar magnet) in the same rotation.

FIGS. 4A-B are views illustrating examples of structures of a magnet used in an absolute encoder. FIGS. 4A-B illustrate the structures of a defective magnet which may occur in the manufacturing process or the assembling process of the magnet. FIG. 4A illustrates a defect that occurs in the manufacturing process of a magnet used in the absolute encoder. FIG. 4A illustrates a multipolar magnet that is different in size. FIG. 4B illustrates an example of a defect that occurs in the assembling process. FIG. 4B illustrates a wrong assembly of the bipolar magnet and the multipolar magnet.

FIG. 5 is a view illustrating an example of a signal waveform detected using a magnet having the structure of FIG. 4. In case of a normal magnet, one rotation of the bipolar magnet and multiple rotations of the multipolar magnet need to coincide with each other at a certain interval. However, when the magnet as shown in FIG. 4 is used, the signals outputted by the first magnetic sensor 110 and the second magnetic sensor 120 do not coincide with each other as shown in FIG. 5.

The technology described below is based on an absolute encoder that uses a defective magnet as shown in FIG. 4. The technology described below may enable accurate measurement of the rotation angle in spite of occurrence of the defect as shown in FIG. 4.

FIG. 6 is a view illustrating an example of a structure of another absolute encoder 200. The absolute encoder 200 includes a first magnetic sensor 210, a second magnetic sensor 220, an Analog to Digital Converter (ADC) 230, a signal generating circuit 240, a signal processing circuit 250, and a storage device 260. The signal generating circuit 240, the signal processing circuit 250 and the storage device 260 may be configured with one circuit. In addition, at least one of the above-described components is not necessarily included in the encoder 200. For example, the storage device 260 may optionally be included in the encoder 200. Although not shown, a bipolar magnet and a multipolar magnet may be located at the rotation axis.

The first magnetic sensor 210 outputs signals (sine wave and cosine wave) according to the rotation of the bipolar magnet, and the second magnetic sensor 220 outputs signals (sine wave and cosine wave) according to the rotation of the multipolar magnet. The signal outputted by the first magnetic sensor 210 may be referred to as a first angle data, and the signal outputted by the second magnetic sensor 220 may be referred to as a second angle data.

The ADC 230 converts an analog waveform signal into a digital signal. The ADC 230 generates digital signals by sampling an A signal and a B signal having a phase of 90 degrees at a certain cycle, respectively.

Although not shown in FIG. 6, the absolute encoder 200 may also include a filter (PLL etc.) that removes noise of the signal itself outputted from the ADC 130.

The signal generating circuit 240 converts the signals delivered from the sensors 210 and 220 into a signal of a triangular waveform. The signal generated by the signal generating circuit 240 may be a signal generated using Phase-Locked Loop (PLL) in Korean Patent No. 10-1468323. The triangular wave outputted by the signal generating circuit 240 may be equal to the signal of the waveform as shown in FIG. 3. Among the signals outputted from the signal generating circuit 240, the signal indicating the rotation in accordance with the first angle data may be referred to as a first waveform signal, and the signal indicating the rotation in accordance with the second angle data may be referred to as a second waveform signal.

The signal processing circuit 250 constantly processes a triangular wave (bipolar magnetic triangular wave) generated from the signal of the first magnetic sensor 210 and a triangular wave (the multipolar magnetic triangular wave) generated from the signal of the second magnetic sensor 220. When the waveforms of the bipolar magnet and the multipolar magnet coincide with each other as shown in FIG. 5, the signal processing circuit 250 corrects the phase difference.

The signal processing circuit 250 first checks the location (m) of the rotation cycle of the magnet that is being measured by the multipolar magnet. In case of a multipolar magnet, when the rotation axis makes one revolution, a plurality of identical sine waves is generated. Referring to FIG. 3, four waveforms are generated in the quadrupolar magnet. The location of the rotation cycle indicates where a currently measured signal among the four waveforms is located. For example, if the four waveforms are Nos. 1, 2, 3 and 4 in order, the signal processing circuit 250 determines which No m is. m may be calculated as shown in Equation 1 below. When the calculation result of Equation 1 includes decimal places, the decimal places may be ignored.

$$m = \text{(bipolar sensor signal value)} * \text{(number of poles of multipolar magnet)}/(2*\pi) \quad \text{Eq. (1)}$$

After obtaining the value m, the signal processing circuit 250 converts the first waveform signal into a signal having the same cycle as the second waveform signal. In this case, the generated signal is referred to as a third waveform signal. That is, the signal according to the rotation of the bipolar magnet is converted into a signal having the same cycle as the signal according to the rotation of the multipolar magnet. The third waveform signal (tran sin) is generated using Equation 2 below.

$$\text{tran sin} = \text{(bipolar sensor signal value)} * \text{(number of poles of multipolar magnet)} - 2*\pi*m \quad \text{Eq. (2)}$$

The signal processing circuit 250 calculates a difference between the second waveform signal and the third waveform signal that have the same cycle. The signal processing circuit 250 calculates a difference (error) between two signals as shown in Equation 3 below. The signal processing circuit 250 calculates the difference between two signals by subtracting the third waveform signal (tran sin) value from a multipolar sensor signal value.

$$\text{error} = \text{(multipolar sensor signal value)} - \text{tran sin} \quad \text{Eq. (3)}$$

The signal processing circuit 250 determines a new reference value, based on the difference between the second waveform signal and the third waveform signal. The signal processing circuit 250 calculates a reference value n using Equation 4 below.

$$n = m+1 \text{(if error} \geq 0 \text{) or } n = m \text{(if error} < 0 \text{)} \quad \text{Eq. (4)}$$

If the error value is greater than or equal to 0, the signal processing circuit 250 obtains a value n by adding 1 to m. On the other hand, if the error value is smaller than 0, the signal processing circuit 250 maintains the value m as it is and obtains a value n. This process determines a reference value for correcting a phase difference occurring in two signals.

The signal processing circuit 250 calculates an angle result by summing the determined reference value n and the signal value of the multipolar sensor as shown in Equation 5 below.

$$\text{angle result} = \text{(multipolar sensor signal value)} + 2*\pi*n \quad \text{Eq. (5)}$$

The signal processing circuit 250 finds a matching absolute angle in a table stored in the storage device 260 based on the calculated angle result value. The table is provided in advance, and stores the angle result values and the absolute angles corresponding thereto. Thus, the encoder 200 finally determines the absolute angle.

On the other hand, the absolute angle may be measured without using the angular result value like the encoder 200 of FIG. 6. In this case, the storage device 260 of this figure is not necessarily included in the encoder 200. For example, the signal processing circuit 250 may convert the error value calculated in Equation 3 into a value errortrans corresponding to the period of the first waveform signal using Equation (6) below.

$$\text{errortrans} = \text{error/(number of poles of multipolar magnet)} + m*2*\pi/\text{(number of poles of multipolar magnet)} \quad \text{Eq. (6)}$$

The signal processing circuit 250 can correct the first waveform signal, which is a signal of the bipolar magnet, using Equation (7) below. Equation (7) represents a signal (Fix sin) in which the phase difference is corrected.

$$\text{Fix sin} = \text{(bipolar sensor signal value)} + \text{errortrans} \quad \text{Eq. (7)}$$

As a result, the encoder can generate a waveform having no phase difference even when the defective magnet as shown in FIG. 3 is used by using Equations (6) and (7). Referring to FIG. 1, the phase difference correction is performed on the first angle $\theta_1$ and the second angle $\theta_2$ generated by the angle data calculator 140. The absolute angle is calculated using the same configuration as the absolute angle calculator 150 in FIG. 1.

Alternatively, the encoder can newly obtain the value of n, by re-assigning the value obtained according to Equation (4), to Equation (2) through Equation (4) by considering the value of n as a new value of m. That is, the encoder can repeat the operations of equations (2) through (4) in an infinite loop to continuously correct/compensate the value of m until the error value falls below a certain value.

FIG. 7 shows an ideal signal waveform detected by a sensor according to the rotation of the bipolar magnet and the multipolar magnet in the absolute encoder configured as shown in FIG. 2. In FIG. 7, the horizontal axis denotes time, and the vertical axis denotes the degree of rotation. Also, in FIG. 7, the dotted line denotes a signal waveform (i.e., bipolar magnetic triangular wave) detected according to the rotation of the bipolar magnet, and the solid line denotes a signal waveform (i.e., a multipolar magnetic triangular wave) according to the rotation of the multipolar magnet under the same rotation condition. The number of rotations of the multipolar magnet may be influenced by the value of the output signal of the bipolar sensor, which can be expressed by Equation 1 as described above.

Referring to FIG. 7, in case of ideal signal waveform, one rotation of the bipolar magnet and multiple rotations of the multipolar magnet coincide with each other at a regular interval/cycle. However, this signal may be hardly outputted as shown in FIGS. 8 and 9 due to the different sizes of the magnets or the assembly tolerance during the actual mass production.

FIG. 8A illustrates an example of a defective absolute encoder in which a bipolar magnet and a multipolar magnet are defectively assembled during the assembly process. FIGS. 8B and 8C show examples of signal waveforms outputted by the defective absolute encoder. Particularly, FIG. 8B shows a case where the bipolar magnet signal precedes the multipolar magnet signal, and FIG. 8C shows a case where the bipolar magnet signal is later than the multipolar magnet signal.

In this disclosure, a 'bipolar magnet signal (first angle data, bipolar magnetic triangle wave or bipolar sensor signal value)' may indicate triangular wave/waveform/angle value derived or generated from a signal detected by the bipolar sensor (or first magnetic sensor) that is a sensor disposed in the bipolar magnet according to the rotation of the bipolar magnet. The 'multipolar magnet signal (second angle data, multipolar magnetic triangular wave or multipolar sensor signal value)' may indicate a triangular wave/waveform/angle value derived or generated from a signal detected by the multipolar sensing sensor (or second magnetic sensor) that is a sensor disposed in the multipolar magnet.

Referring to FIGS. 8B and 8C, it can be seen that one rotation of the bipolar magnet and multiple rotations of the multipolar magnet do not coincide with each other at a regular interval/cycle like the ideal signal of FIG. 7.

FIG. 9A illustrates an example of a defective absolute encoder in which the sizes of multipolar magnets are differently produced in the process of mass production of multipolar magnets. FIG. 9B shows an example of a signal waveform outputted by the defective absolute encoder.

Referring to FIG. 9B, it can be seen that one rotation of the bipolar magnet and multiple rotations of the multipolar magnet do not coincide with each other at a regular interval/cycle like the ideal signal of FIG. 7.

Hereinafter, an additional solution for compensating the output signal waveform of the defective absolute encoder as shown in FIGS. 8 and 9 to an ideal waveform will be discussed.

The solution proposed above with reference to FIG. 6 may only perform compensation only when the bipolar magnet signal precedes the multipolar magnet signal as shown in FIG. 8B. However, the solution discussed below can perform compensation even when the bipolar magnet signal is later than the multipolar magnet signal as shown in FIG. 8C as well as the case shown in FIG. 8B. In this example, since the block diagram of FIG. 6 described above can be equally applied to this solution, the corresponding solution will be described later by referring again to FIG. 6. However, the storage device 260 in the block diagram of FIG. 6 may optionally be included according to an embodiment described below.

Also, since this solution can be equally applied up to the process of acquiring the location m of the rotation cycle of a magnet (or the number of revolutions of the multipolar magnet, where m indicates the approximate number of revolutions and does not indicate the correct number of revolutions), the descriptions of the repeated processes will be omitted.

Referring again to FIG. 6, the signal processing circuit 250 obtains the value of m in accordance with Equation 1, and then converts a multipolar magnet signal value at a specific time point into a fourth waveform signal (tran sin) in accordance with Equation 8 below using the value m.

$$transin = \frac{\{(signal\ value\ of\ multipolar\ magnet) + m*2*\pi\}}{number\ of\ poles\ of\ multipolar\ magnet} \quad \text{Eq. (8)}$$

When the fourth waveform signal is calculated according to Equation (8), a thin dotted line waveform in FIG. 10 is corrected to a thick dotted line waveform (fourth waveform signal). By comparing the corrected signal value with the bipolar magnet signal value, it is a measure of whether there is an error (i.e., whether or not the m value is erroneous). That is, the reason why the fourth waveform signal value is obtained is to judge whether or not the m value is correct.

The signal processing circuit 250 can calculate the error value by calculating a difference between the fourth waveform signal and the bipolar magnet signal value at a specific time point as shown in Equation 9. This error value may be used to correct or adjust the value m in each embodiment.

$$error = (tran\ sin - signal\ value\ of\ bipolar\ magnet) \quad \text{Eq. (9)}$$

If the error value calculated from Equation 9 is larger than a value obtained by dividing the bipolar magnet signal value by (2*number of poles of multipolar magnet), the signal processing circuit 250 corrects or adjusts the value m based on Equation 10. Here, the value obtained by dividing the bipolar magnet signal value by (2*multipolar magnetic pole number) denotes the maximum error value. In examples where the error value calculated by the Equation 9 is larger than the maximum error value may mean that an error in which the bipolar magnet signal precedes the multipolar magnet signal occurs as shown FIGS. 8B and 9B.

$$m = \quad \text{Eq. (10)}$$
$$m - 1\left(if\ error > \frac{signal\ value\ of\ bipolar\ magnet}{2*number\ of\ poles\ of\ multipolar\ magnet}\right)$$

In Equation 10, when the value m corrected or adjusted is calculated as '−1' because the value m to be corrected/adjusted is '0', the signal processing circuit 250 additionally calculates Equation 11 to obtain 3 (=number of poles of multipolar magnet−1=4−1=3) that is a previous cycle value.

$$m = (number\ of\ poles\ of\ multipolar\ magnet-1)(if\ m<0) \quad \text{Eq. (11)}$$

Thus, the corrected/adjusted final value m is used to calculate a final angle result value by Equation 14 described below.

If the error value calculated from Equation 9 is smaller than a value $$= -\frac{signal\ value\ of\ bipolar\ magnet}{2*number\ of\ poles\ of\ multipolar\ magnet}$$

obtained by dividing a negative bipolar magnet signal value by (2*number of poles of multipolar magnet), the signal processing circuit 250 corrects or adjusts the value m based on Equation 12. Here, the error value indicates an offset value of the multipolar magnet signal and the bipolar magnet signal, and the range of the offset value is determined as being equal to or larger than $$-\frac{signal\ value\ of\ bipolar\ magnet}{2*number\ of\ poles\ of\ multipolar\ magnet}$$

and equal to or smaller than $$\frac{signal\ value\ of\ bipolar\ magnet}{2*number\ of\ poles\ of\ multipolar\ magnet}.$$

The case where the error value calculated by Equation 9 is smaller than $$-\frac{signal\ value\ of\ bipolar\ magnet}{2*number\ of\ poles\ of\ multipolar\ magnet}$$

may mean that an error in which the bipolar magnet signal is later than the multipolar magnet signal occurs as shown in FIG. 8C.

$$m = m + \quad \text{Eq. (12)}$$
$$1\left(if\ error < -\frac{signal\ value\ of\ bipolar\ magnet}{2*number\ of\ poles\ of\ multipolar\ magnet}\right)$$

In Equation 12, when the value m corrected or adjusted is calculated as '4' because the value m to be corrected/adjusted is '3', the signal processing circuit 250 additionally calculates Equation 11 to obtain 0 that is a previous cycle value.

$$m=0(if\ m>(number\ of\ poles\ of\ multipolar\ magnet-1)) \quad \text{Eq. (13)}$$

The signal processing circuit 250 can re-assign the final m value acquired using different mathematical expressions as m values in Equation (8) for obtaining the tran sin value. That is, the encoder can continuously compensate/correct the m value by calculating the Equations 8 through 13 in an infinite loop so that the error value is kept below a certain value.

Alternatively, the signal processing circuit 250 may calculate/obtain a final angle result value (angleresult) by substituting the final value m obtained using different Equations for each situation into the Equation 14.

$$Angleresult = signal\ value\ of\ multipolar\ magnet + 2*\pi*m \quad \text{Eq. (14)}$$

The signal processing circuit 250 finds a matching absolute angle in a table stored in the storage device 260 based on the calculated angle result value. The table may be provided in advance, may store the angle result values and the absolute angles corresponding thereto and may be stored in the storage device 260 in encoder 200. Thus, the encoder 200 may finally determine the absolute angle.

FIGS. 10A-C illustrate signal waveforms compensated by a disclosed solution. Particularly, FIG. 10A shows a signal waveform obtained by correcting the signal waveform of FIG. 8B according to the above-described solution. FIG.

10B shows a signal waveform obtained by correcting the signal waveform of FIG. 9B according to the above-described solution. FIG. 10C shows a signal waveform obtained by correcting a signal waveform of FIG. 8C according to the above-described solution. In FIG. 10A-C, a thick dotted line indicates a fourth waveform signal (tran sin), and a thin dotted line indicates a bipolar magnet signal.

Referring to FIGS. 10A-C, it can be seen that the fourth waveform signal, which is the corrected multipolar magnet signal, is corrected so as to meet the bipolar magnet signal at a certain cycle/interval(that is, corrected into a form ideal signal).

In addition to the measurement of the number of rotations of the multipolar magnet and the bipolar magnet, there is a system capable of measuring the number of rotations only with two bipolar magnets. Hereinafter, an encoder output signal correction solution in this system will be described.

FIG. 11A is a view illustrating an example of a structure of multi-turn absolute rotation module of an absolute encoder including three secondary-shaft gears (A, B, C) mesh with a main-shaft gear (M). FIG. 11B is a view illustrating a structure of two shaft A-shaft and main-shaft. FIG. 11C is a view illustrating an ideal signal waveform outputted from an absolute encoder having the structure as shown in FIG. 11B.

The absolute encoder having a magnet structure (i.e., including single-turn angle and multi-turn absolute rotation modules) shown in FIG. 11A measures the number of rotations using the gear ratio (for example, the number of gear teeth of M=24 and the number of gear teeth of A=30) of the M-gear shaft and the A-gear shaft. An ideal signal outputted through this absolute encoder is shown in FIG. 11C. In this case, the sensors for sensing the rotation of the bipolar magnet may be disposed at the center of each bipolar magnet. For example, a first magnetic sensor may be disposed at the center of the bipolar magnet of the M-gear shaft, and a second magnetic sensor may be disposed at the center of the bipolar magnet of the A-gear shaft.

In FIG. 11C, the thin solid line indicates a 'first bipolar magnetic triangle wave' detected by the first magnetic sensor disposed in the M-gear shaft, and a thin dotted line indicates a 'second bipolar magnetic triangle wave' detected by the second magnetic sensor disposed in the A-gear shaft. Also, a thick solid line indicates a difference between the two bipolar magnetic triangular waves. When the difference between the bipolar magnetic triangular waves coincides with the first bipolar magnetic triangular waves at a regular interval/cycle as shown in the drawing, the signal waveform may be considered as an ideal signal waveform.

However, an absolute encoder including two bipolar magnets may also be defectively manufactured in the manufacturing process. Consequently, an ideal waveform as shown in FIG. 11B may not be outputted.

FIG. 12A illustrates an example of a defective multi-turn absolute rotation module of absolute encoder manufactured with A-shaft gear mesh with a main-shaft gear (M-gear). FIG. 12B illustrates a signal waveform outputted from a defective structure in FIG. 12A.

Thus, the signal waveform outputted from the defective absolute encoder can also be compensated similarly to a phase error method between the bipolar magnet and the multipolar magnet. Hereinafter, a compensation solution for a phase error signal using a gear ratio and a bipolar magnet will be proposed.

Since the block diagram of FIG. 6 described above can also be equally/similarly applied to this solution, this solution will be described below by referring again to FIG. 6. In FIG. 6, the first magnetic sensor corresponds to a sensor disposed in the M-gear shaft, and the second sensor corresponds to a sensor disposed in the A-gear shaft. Also, the signal generating circuit 240 outputs two bipolar magnetic triangular waves generated based on the signals detected from the first and second sensors to the signal processing circuit 250.

If the number of teeth of the M-gear shaft disposed in the absolute encoder is 24 and the number of teeth of the A-gear shaft is 30, the gear rotation ratio of the M-gear shaft and the A-gear shaft may be 4:5. In this case, if the angle of the M-gear shaft (or the first angle data) is $\varphi_M$, and the angle of the A-gear axis (or the second angle data) is $\varphi_A$, the intermediate value $\varphi_{MA}$ used to compensate for the phase error can be calculated by the signal processing circuit 250 according to Equation 15.

$$\varphi_{MA} = \varphi_M - \varphi_A \quad \text{Eq. (15)}$$

According to Equation 15, when $\varphi_{MA}$ is calculated as a value less than 0, it can be corrected according to Equation 16.

$$\varphi_{MA} = \varphi_{MA} + 2*\pi \quad \text{Eq. (16)}$$

Since the bipolar magnet of the M-gear shaft and the bipolar magnet of the A-gear shaft are always synchronized, not representing the same waveform, Equation 16 can be used for the purpose of synchronizing the bipolar magnet of the M-gear shaft and the bipolar magnet of the A-gear shaft as shown in FIG. 12B. That is, Equation 16 is to make a signal whose angular value increases up to $2*\pi$.

The number of rotations m of the M-gear shaft can be calculated based on $\varphi_{MA}$. More specifically, the signal processing circuit 250 can calculate the value m, which is the number of revolutions of the M-gear shaft, according to Equation 17.

$$m = (\varphi_{MA})*(a)/(2*\pi) \quad \text{Eq. (17)}$$

In Equation 17, the value a indicates a value of the gear ratio of the A-gear shaft in the gear ratio between the M-gear shaft and A-gear shaft. For example, when the gear ratio between the M-gear shaft and the A-gear shaft is 4:5, the value a is 5.

Next, the signal processing circuit 250 can obtain a fifth waveform signal (tran sin), obtained by deforming $\varphi_M$ that is the angle of the M-gear shaft from Equation 18.

$$transin = \frac{\{(\varphi_M) + m*2*\pi\}}{a} \quad \text{Eq. (18)}$$

The signal processing circuit 250 can obtain an error value by calculating a difference between the fifth waveform signal (tran sin) and the intermediate value $\varphi_{MA}$ from Equation 19 below.

$$\text{error} = (\text{tran sin} - \varphi_{MA}) \quad \text{Eq. (19)}$$

If the error value calculated from Equation 19 is larger than a value obtained by dividing the intermediate value $\varphi_{MA}$ by $2*a$, the value m can be corrected and adjusted by the signal processing circuit 250 as shown in Equation 20. Here, when the calculated error value is larger than the value obtained by dividing the intermediate value $\varphi_{MA}$ by $2*a$, the signal waveform corresponding to the bold solid line may precede the signal waveform corresponding to the thin solid/dotted lines on the time axis in FIG. 12B as shown in FIG. 8B or 9B.

$$m = m - 1 \left( \text{if error} > \frac{\varphi_{MA}}{2*a} \right) \quad \text{Eq. (20)}$$

In Equation 20, $$\frac{\varphi_{MA}}{2*a}$$

indicates the maximum error value.

If the value m corrected and adjusted according to Equation 20 is smaller than 0, it can be additionally corrected and adjusted according to Equation 21.

$$m=(a-1)(\text{if } m<0) \quad \text{Eq. (21)}$$

The thus corrected/adjusted final m value can be reassigned as m value in Equation 18 for obtaining the tran sin value. That is, the encoder can continuously compensate/correct the m value by calculating the operation of equations (18) to (21) in an infinite loop so that the error value is kept below a certain value.

If the error value calculated from Equation 19 is smaller than a value obtained by dividing the negative (−) intermediate value −$\varphi_{MA}$ by 2*a, the value m can be corrected and adjusted by the signal processing circuit 250 as shown in Equation 22. Here, when the calculated error value is smaller than the value obtained by dividing the negative (−) intermediate value −$\varphi_{MA}$ by 2*a, the signal waveform corresponding to the bold solid line may be later than the signal waveform corresponding to the thin solid/dotted lines on the time axis in FIG. 12B as shown in FIG. 8C.

$$m = m + 1 \left( \text{if error} < -\frac{\varphi_{MA}}{2*a} \right) \quad \text{Eq. (22)}$$

If the value m corrected and adjusted according to Equation 22 is larger than (a−1), it can be additionally corrected and adjusted according to Equation 23.

$$m=0(\text{if } m>(a-1)) \quad \text{Eq. (23)}$$

The signal processing circuit 250 can re-assign the final m value obtained using different Equations according to the intermediate value $\varphi_{MA}$ as the m value in the Equation 18 for obtaining the tran sin value. That is, the encoder can continuously compensate/correct the m value by calculating Equations 18, 19, 22 and 23 in an infinite loop such that the error value remains below a certain value.

In the case of applying this solution, when the signal waveform corresponding to the bold solid line in FIG. 12B is ahead of the signal waveform corresponding to the thin solid/dotted lines on the time axis, compensation/correction may be performed as shown in FIGS. 10A and 10B. When the signal waveform corresponding to the bold solid line in FIG. 12B is later than the signal waveform corresponding to the thin solid line/dotted lines on the time axis, compensation/correction may be performed as shown in FIG. 10C. As a result, as shown in FIG. 11B, the bold solid line waveform and the thin solid line waveform can be corrected into an ideal waveform in which the two waveforms meet each other at a certain cycle.

The present disclosure provides an encoder capable of using a multipolar magnet that is determined to be defective in a manufacturing process or an assembling process.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining an angle by an encoder, the method comprising:
    generating a first angle data based on a rotation of a bipolar magnet and a second angle data based on a rotation of the multipolar magnet;
    determining a first waveform signal based on the first angle data and a second waveform signal based on the second angle data;
    converting the first waveform signal into a third waveform signal having a cycle similar to the second waveform signal;
    calculating an angle result value as a fuction of the second angle data and a determined value about a location of a rotation cycle of the multipolar magnet based on a difference between the second waveform signal and the third waveform signal; and
    determining an absolute angle corresponding to the calculated angle result value based on stored angle data.

2. The method of claim 1, wherein the encoder determines a location of the rotation cycle of the bipolar magnet, and converts the first waveform signal into the third waveform signal based on the location and a value obtained by subtracting two from a number of poles of the multipolar magnet.

3. The method of claim 1, wherein the encoder determines the determined value as a value obtained by adding 1 to the location of the rotation cycle when the difference is greater than or equal to 0, and determines the determined value as the location of the rotation cycle when the difference is less than 0.

4. The method of claim 1, wherein the encoder determines the location of the rotation cycle by dividing a value obtained by multiplying the first angle data by a number of poles of the multipolar magnet by 2π.

5. The method of claim 1, wherein the encoder converts the third waveform signal by subtracting a value obtained by multiplying 2π by the location of the rotation cycle from a value obtained by multiplying the first angle data by a number of poles of the multipolar magnet.

6. The method of claim 1, wherein the encoder calculates the angle result value by adding a value obtained by multiplying 2π by the location of the rotation cycle to the second angle data, and the location of the rotation cycle is determined by dividing a value obtained by multiplying the first angle data by a number of poles of the multipolar magnet by 2π.

7. A method of correcting an outputted signal by an encoder, the method comprising:

generating a first angle data based on a rotation of a bipolar magnet and a second angle data based on a rotation of the multipolar magnet;

determining a first waveform signal based on the first angle data and a second waveform signal based on the second angle data;

converting the first waveform signal into a third waveform signal having a cycle similar to the second waveform signal;

determining a difference between the second waveform signal and the third waveform signal;

converting the difference based on a period of the first waveform signal to determine a phase difference; and correcting the first waveform signal based on the phase difference.

8. The method of claim 7, wherein the encoder converts the third waveform signal by subtracting a value obtained by multiplying a location of a rotation period by $2\pi$ with a value obtained by multiplying the first angle data by a number of poles of the multipolar magnet, wherein the location of the rotation period is determined by dividing a value multiplied by the number of poles of a multipolar magnet by $2\pi$.

9. The method of claim 7, further comprising calculating an absolute angle using the corrected first waveform signal and the second waveform signal.

10. An absolute encoder, comprising:
a first magnetic sensor outputting first angle data based on a rotation of a bipolar magnet located at a rotation axis;
a second magnetic sensor outputting second angle data based on a rotation of a multipolar magnet located at the rotation axis;
a converter converting output signals of the first magnetic sensor and the second magnetic sensor into digital signals;
a storage device comprising a table with angle result values and absolute angles; and
a signal processing circuit configured to:
determine a first waveform signal based on the first angle data and a second waveform signal based on the second angle data;
convert the first waveform signal into a third waveform signal having a cycle similar to the second waveform signal;
calculate an angle result value as a function of the second angle data and a reference value determined based on a difference between the second waveform signal and the third waveform signal; and
calculate an absolute angle using the calculated angle result value and the table.

11. The absolute encoder of claim 10, wherein the first magnetic sensor is located at a center of the bipolar magnet, and the second magnetic sensor is a pair of sensors located at opposing sides of the multipolar magnet adjacent to the first magnetic sensor.

12. A method of correcting a number of rotations by an encoder, the method comprising: generating a first angle data based on a rotation of a bipolar magnet and a second angle data based on a rotation of a multipolar magnet; calculating a first number of rotations of the multipolar magnet based on the first angle data and a number of poles of the multipolar magnet; converting the second angle data into a third angle data using the first number of rotations; and calculating an error value obtained by subtracting the second angle data from the third angle data, and correcting the first number of rotations to a second number of rotations of the multipolar magnet based on a range of the error value.

13. The method of claim 12, wherein calculating the first number of rotations of the multipolar magnet comprises multiplying the first angle data by a number of poles of the multipolar magnet and dividing the result by $2\pi$ to calculate the first number of rotations of the multipolar magnet.

14. The method of claim 12, wherein converting of the second angle data into the third angle data comprises adding a value obtained by multiplying the first number of rotations by $2*\pi$ to the second angle data and dividing the result by a number of poles of the multipolar magnet.

15. The method of claim 12, wherein correcting the first number of rotations to the second number of rotations comprises:

correcting the first number of rotations to the second number of rotations by subtracting 1 from the first number of rotations when the error value is larger than a value obtained by dividing the first angle data by a double of a number of poles of the multipolar magnet; and determining, when the second number of rotations 1 is less than zero, the second number of rotations as a value obtained by subtracting 1 from the number of poles of the multipolar magnet.

16. The method of claim 12, wherein correcting the first number of rotations to the second number of rotations comprises:

correcting the first number of rotations to the second number of rotations by adding 1 to the first number of rotations when the error value is smaller than a value obtained by dividing a negative value of the first angle data by a double of a number of poles of the multipolar magnet; and determining, when the second number of rotations is larger than a value obtained by subtracting 1 from the number of poles of the multipolar magnet, the second number of rotations as 0.

17. The method of claim 12, further comprising: substituting the second number of rotations for the first number of rotations; and returning to converting the second angle data into the third angle data.

18. A method of correcting a number of rotations by an encoder, the method comprising: generating a first angle data based on a rotation of a bipolar magnet and a second angle data based on a rotation of a multipolar magnet; subtracting the second angle data from the first angle data to obtain an intermediate value; calculating a number of rotations of the bipolar magnet based on the intermediate value and a rotation ratio of the multipolar magnet with respect to one rotation of the bipolar magnet; converting the first angle data into a third angle data using the number of rotations of the bipolar magnet and the rotation ratio of the multipolar magnet; and calculating an error value by subtracting the intermediate value from the third angle data, and correcting the number of rotations of the bipolar magnet based on a range of the error value.

19. The method of claim 18, wherein correcting of the number of rotations comprises: subtracting 1 from the number of rotations when the error value is larger than a value obtained by dividing the intermediate value by a double of the rotation ratio of the multipolar magnet; and determining, when the number of rotations corrected by subtracting by 1 is less than zero, the number of rotations as a value obtained by subtracting 1 from the rotation ratio of the multipolar magnet.

20. The method of claim 18, wherein correcting of the number of rotations comprises: adding 1 to the number of rotations when the error value is smaller than a value obtained by dividing a negative value of the intermediate value by a double of the rotation ratio of the multipolar magnet; and determining, when the number of rotations corrected by adding 1 is larger than a value obtained by subtracting 1 from the rotation ratio of the multipolar magnet, the number of rotations as 0.

* * * * *